United States Patent
Savage et al.

(10) Patent No.: US 9,875,552 B1
(45) Date of Patent: Jan. 23, 2018

(54) CONTENT INDEPENDENT METHOD OF MOTION DETERMINATION USING SPARSE MATRICES

(71) Applicant: Teradici Corporation, Burnaby (CA)

(72) Inventors: Joseph Michel Kenneth Savage, Vancouver (CA); Paul Andrew Helter, Port Moody (CA); Peter William Longhurst, Vancouver (CA)

(73) Assignee: Teradici Corporation, Burnaby, British Columbia (CA)

( * ) Notice: Subject to any disclaimer, the term of this patent is extended or adjusted under 35 U.S.C. 154(b) by 0 days.

(21) Appl. No.: 15/219,897

(22) Filed: Jul. 26, 2016

(51) Int. Cl.
*G06K 9/36* (2006.01)
*G06T 7/20* (2017.01)

(52) U.S. Cl.
CPC .. *G06T 7/2033* (2013.01); *G06T 2207/10016* (2013.01)

(58) Field of Classification Search
CPC ........... G06T 7/20; G06T 7/215; G06T 7/223; G06T 2207/10016
See application file for complete search history.

(56) References Cited

U.S. PATENT DOCUMENTS

| | | | |
|---|---|---|---|
| 6,983,020 B2 | 1/2006 | Christiansen | |
| 8,681,870 B2 | 3/2014 | Takada | |
| 8,787,460 B1 * | 7/2014 | Hobbs | H04N 19/00 375/240.16 |
| 2011/0026598 A1 * | 2/2011 | Takada | H04N 19/56 375/240.16 |
| 2011/0299785 A1 | 12/2011 | Albu et al. | |
| 2014/0362930 A1 * | 12/2014 | Brockmann | H04N 19/103 375/240.26 |
| 2015/0110345 A1 * | 4/2015 | Weichselbaum | G01S 3/7864 382/103 |
| 2016/0269732 A1 * | 9/2016 | Li | H04N 19/593 |
| 2016/0277733 A1 * | 9/2016 | Li | H04N 19/593 |
| 2017/0163999 A1 * | 6/2017 | Li | H04N 19/52 |

* cited by examiner

*Primary Examiner* — John Strege
(74) *Attorney, Agent, or Firm* — Moser Taboada (57) ABSTRACT

A method and apparatus for motion determination comprising generating a hash value for each changed pixel in a frame of an image display sequence, the changed pixels indicated in a set of sparse display coordinates, for each changed pixel, overwriting (X, Y) information at a position in a symbol table indexed by the hash value, the (X, Y) information comprising one display coordinate associated with the each changed pixel, generating motion vectors for a frame, each motion vector specifying a pixel area determined from at least one (X, Y) delta between one of the changed pixels represented in the symbol table and a previously changed pixel represented at the position in a previous frame symbol table for a previous frame in the image display sequence, and transmitting the motion vectors from the host computer over a network to a client computer.

20 Claims, 8 Drawing Sheets

CONTENT INDEPENDENT METHOD OF MOTION DETERMINATION USING SPARSE MATRICES

BACKGROUND OF THE INVENTION

Field of the Invention

Embodiments of the present invention relate generally to a method and apparatus for content independent lossless motion determination of parts of a display image sequence using sparse matrices.

Description of the Related Art

Block based lossy motion compensation is a key feature of video compression which exploits temporal redundancy in a sequence of video frames. Such motion compensation provides lossy compression of natural image data which, when under motion, are generally tolerant of image compression artifacts. However, image content such as text and icons which are characteristic of computer display images are intolerant to distortion under motion because perceptual image quality must be maintained to uphold user experience. Furthermore, user experience is compromised when the image quality of previously rendered static content such as a photograph displayed in a window is temporarily degraded via lossy compression when the window itself is dragged around a computer desktop. Therefore, such lossy compression is unsuitable for many applications involving computer-rendered images such as remote desktops.

In the field of remote desktop displays, lossless motion compensation overcomes the limitations of video compression which cause excessive distortion. One well known approach involves identifying visual anchor points in a reference image and determining motion vectors by searching for similar visual anchor points at different locations in the input image. However such an approach is highly processing intensive. Not only must both reference and input image be searched for predetermined pixel patterns, pixel patterns need to be sufficiently generic to generate multiple instances of each visual anchor to avoid the problem of no anchors being determined at all. A problem with multiple instances of visual anchors is that additional processing is required to extract valid motion vectors from a potential list of many different candidates for each anchor. Another well-known approach generates extensive identifiers in a reference image followed by generating selective block identifiers in the input image at horizontal and/or vertical offsets, enabling a determination of lossless motion vectors for select computer interaction activities such as horizontal or vertical window scrolling. Besides directionality limitations, this approach also demands significant processing and is best suited to hardware-based image encoding.

Therefore, the need remains for a lossless motion compensation technique which imposes efficient demands on processing resource utilization and is therefore suitable for software implementations.

SUMMARY OF THE INVENTION

Embodiments of the present invention generally relate to a method for content independent lossless motion determination of parts of a display image sequence. The method comprises generating, at a host computer, a hash value for each changed pixel of changed pixels in a frame of the image display sequence, the changed pixels indicated in a set of sparse display coordinates, for each changed pixel, overwriting (X, Y) information at a position in a symbol table indexed by the hash value, the (X, Y) information comprising one display coordinate? in the set of sparse display coordinates associated with the each changed pixel, generating motion vectors for a frame in the image display sequence, each motion vector specifying a pixel area determined from at least one (X, Y) delta in the (X, Y) information between one of the changed pixels represented in the symbol table and a previously changed pixel represented at the position in a previous frame symbol table, the previous frame symbol table for a previous frame in the image display sequence and transmitting the motion vectors from the host computer over a network to a client computer.

Further embodiments of the present invention relate to an apparatus for content independent lossless motion determination of parts of a display image sequence. The apparatus comprises a host processor of a host computer comprising a hash engine that generates a hash value for each changed pixel of changed pixels in a frame of the image display sequence, the changed pixels indicated in a set of sparse display coordinates, and wherein the host processor, for each changed pixel, overwrites (X, Y) information at a position in a symbol table indexed by the hash value, the (X, Y) information comprising one display coordinate in the set of sparse display coordinates associated with the each changed pixel. The host processor further comprises a difference processor that generates motion vectors for a frame in the image display sequence, each motion vector specifying a pixel area determined from at least one (X, Y) delta in the (X, Y) information between one of the changed pixels represented in the symbol table and a previously changed pixel represented at the position in a previous frame symbol table, the previous frame symbol table for a previous frame in the image display sequence. Finally, the host processor further transmits the motion vectors from the host computer over a network to a client computer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The invention may be implemented in numerous ways, including as a process, an article of manufacture, an apparatus, a system, and as a set of computer-readable descriptions and/or instructions embedded on and/or in a computer-readable medium such as a computer-readable storage medium. In this specification, these implementations, or any other form that the invention may take, may be referred to as techniques. The Detailed Description provides an exposition of one or more embodiments of the invention that enable improvements in features such as performance, power utilization, cost, scalability, efficiency, and utility of use in the field identified above. The Detailed Description includes an Introduction to facilitate the more rapid understanding of the remainder of the Detailed Description. The invention encompasses all possible modifications and variations within the scope of the issued claims.

The term processor as used herein refers to any type of processor, central processing unit (CPU), microprocessor, microcontroller, embedded processor, media processor, graphics processor, or any other programmable device capable of executing and/or interpreting instructions in a form of software (such as microcode, firmware and/or programs).

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted.

Introduction

Figure 1:
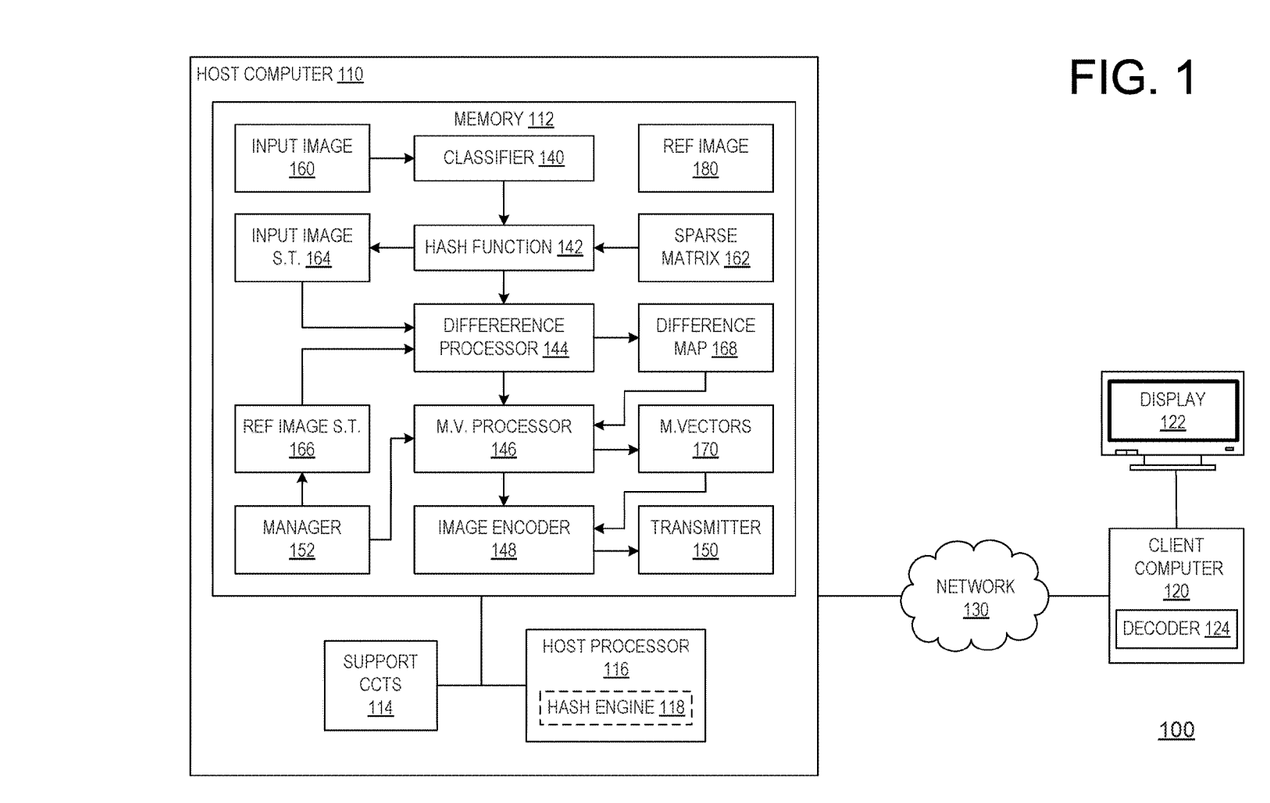
FIG. 1 illustrates selected details of a remote computing system in accordance with exemplary embodiments of the present invention.

In one or more embodiments of the present invention, a remote computing system, such as system 100 in FIG. 1, comprises a host computer coupled via a network to a client computer with a display. Software applications on the host computer, in conjunction with an operating system produce a sequence of mixed content image updates (i.e., an image sequence comprising content such as background, text, natural images, video frames and high detail objects) rendered as pixel values to a frame buffer in system memory. Some content may change location in response to user input, for example a rendered photo or file viewer dragged across a display or a word processing document under control of scroll bars. Other content may be associated with a video player and change at a periodic source frame rate such as 5, 24 or 30 frames per second. Rather than, or in addition to, displaying the image sequence locally at the host computer, the updates to the image sequence are encoded at the host computer as image and motion information which is transmitted to the client computer. Changed sections of input image frames are classified and masked which enables non-video sections of the changed input image to be subjected to the CPU and memory bandwidth efficient motion determination technique disclosed in detail herein.

Sets of pixels associated with select predetermined fixed target coordinate locations of the input image are subjected to a hashing function. In an embodiment, each set of pixels that is subjected to the hashing function comprises a set of 32-bit values associated with the target pixel, each 32-bit value comprising concatenated 8-bit Red, Green, Blue (RGB) and alpha values. For example, such a set of pixels may comprise a linear group of pixels associated with the fixed target coordinate. Following the hashing function, part of each generated hash value is used as an index to populate an input image symbol table in which the symbol comprises the (X,Y) co-ordinates of the predetermined location corresponding with the hash value. Unlike a conventional hash table used in conjunction with the hashing of visual anchor points and in which each table index may relate to many entries (e.g. a chained set), the symbol table of the present invention is updated by replacing previous entries, thereby producing a unique mapping between each table index and a single corresponding table entry.

Candidate motion vectors are determined by evaluating changes in (X,Y) co-ordinate pairs at indices in the input image symbol table compared to the (X,Y) co-ordinate pairs for the same indices in a reference image symbol table which is associated with a previous image frame. Because the input image symbol table contains strictly a single set of co-ordinates for each table entry, candidate evaluation is directly accomplished via a lightweight ranking process. However, the input image symbol table is susceptible to pollution, e.g. display changes unrelated to motion such as pop-up notification windows or the like that also generate hash values which are entered in the input image symbol table. Such pollution is averted by periodically refreshing the table entries at the predetermined locations which have remained unchanged over a specified period.

FIG. 1 illustrates selected details of an embodiment of a remote computing system 100 ("system 100") for remote display of a computer image sequence. System 100 comprises a host computer 110, such as a personal computer, a computer server, or the like, coupled to and enabled to communicate with one or more communication endpoints, such as client computer 120, by an Internet Protocol (IP) packet network 130. In a virtualized environment such as a virtualized desktop infrastructure (VDI) or desktop-as-a-service (DaaS) deployment, system 100 comprises many client computers not depicted in FIG. 1 in communication with the host computer 110 via network 130.

Host computer 110 ("computer 110") is, generally, a computer or system of computers comprising the host processor 116 which, in various embodiments, comprises one or more central processing units (CPUs), one or more graphics processing units (GPUs), or a combination of CPU and GPU processing elements communicatively coupled to memory 112 by well-known support circuits 114 such as north bridge, south bridge, power supplies, data registers, network interface and the like that enable communications between the elements of computer 110 in addition to communications between computer 110 and the network 130. The memory 112 may be allocated to CPU resources, GPU resources or both. In an embodiment, the host processor 116 comprises a hardware hash engine 118 such as a hashing circuit compatible with the Advanced Encryption Standard (AES) New Instruction (AES-NI) by INTEL CORPORATION.

The computer 110 is designated for running application software such as a word processor, spreadsheet application, Computer Aided Design (CAD) software, a digital photo viewer, video player software and the like, and generating a visual user interface, i.e., an input image 160 stored as an ephemeral set of pixel values in a buffer of memory 112. The input image 160 may comprise a host rendered desktop display image or a host rendered published application display image which is updated in response to user input, application, or operating system events. The reference image 180 comprises the input image from the previously processed frame in the sequence of input images.

Once pixel updates have been applied to the input image 160 (e.g. via operating system drawing routines), the input image 160 is subjected to classification and processing to extract lossless motion vectors for transmission to the client computer 120. Changed areas not covered by lossless motion vectors are encoded using lossy or lossless techniques (e.g. Discrete Wavelet Transform (DWT), Discrete Cosine Transform (DCT), color cache encoding or Lempel-Ziv-Welch (LZW) compression) as offered by image encoder 148 preceding transmission to the client computer 120.

The classifier 140 identifies locations of changed content such as pixels or blocks of pixels (e.g. 8×8 blocks or 16×16 blocks) that have changed since the previous frame in the input image sequence was processed. In an embodiment, the classifier 140 identifies rapidly changing natural image content which, in the interests of CPU efficiency, is masked as video content and excluded from the motion vector processing described herein, including hash function 142. Such masked video content is either subjected to frequency domain encoding services of the image encoder 148 such as the lossy or lossless techniques listed, standardized encoding (e.g. H.264 or H.265 encoding), transcoding or redirection of the compressed source which is then transmitted to the client computer 120.

Changed non-video areas of the input image 160 are subjected to lossless motion scrutiny by functions including the hash function 142, difference processor 144 and motion vector processor 146 which are described in association with the method 1000 below. The sparse matrix 162 (or, unit matrix 162) specifies the target pixel locations in the input image 160 designated for scrutiny. The input image symbol table 164 stores the pixel co-ordinates of the scrutinized pixels and the difference map 168 stores candidate motion vectors based on a comparison between entries in the input image symbol table 164 and a reference image symbol table 166 associated with a previously scrutinized image frame. As a new input image in a display sequence is subject to scrutiny, the input image symbol table 164 is recast as the reference image symbol table 166 for the subsequent processing iteration. Confirmed lossless motion vectors (i.e. vectors that specify sets of designated pixels in the input image 160 confirmed to exactly match sets of pixels elsewhere in the reference image 180) are stored in table 170 which, in an embodiment, may comprise a subsection of the reference image symbol table 166. Motion vectors may be subjected to arithmetic encoding or alternative entropy reduction services of image encoder 148 prior to transmission to the client computer 120 via the transmitter 150, according to non-limiting embodiments. The manager 152 provides various services including reference table management, symbol table pollution mitigation and threshold adjustments which, in an embodiment, utilize configuration settings, bandwidth availability feedback or CPU availability indications to regulate the number of confirmed lossless motion vectors and processing commitment to confirming tertiary motion vectors.

In some embodiments, at least part of the classification, hashing, difference processing, motion vector processing and image encoding functions depicted in memory 112 are implemented as one or more hardware accelerator functions such as part of an application specific integrated circuit (ASIC), field programmable gate array (FPGA) or functional unit of host processor 116 with access to the memory 112 or local memory resources. Such a hardware accelerator may comprise image classification and encoding functions in addition to stream assembly functions for encoding and transmitting source image (e.g., input image 160) and associated motion vectors. In other embodiments, classification, hashing, difference processing, motion vector processing and image encoding functions are implemented, at least in part, as a set of machine executable instructions stored in memory 112 and executed by the host processor 116.

In VDI or DaaS embodiments, part of the memory 112 stores a plurality of operating systems, each comprising encoding functions, each associated at connection time with a particular client computer. In a multi-session embodiment such as a Remote Desktop Session Host (RDSH) or published application environment, many users or applications share an operating system, each user having a separate container space comprising at least one input image and a set of encoding functions.

The network 130 comprises a communication system (e.g., the Internet, local area network (LAN), wireless LAN, wide area network (WAN), and the like) that connects computer systems completely by wire, cable, fiber optic, and/or wireless links facilitated by various types of well-known network elements, such as hubs, switches, routers, and the like. In one embodiment, the network 130 may be a shared packet switched network that employs various well-known protocols (e.g., TCP/IP, UDP/IP and the like) to communicate information amongst the network resources. For example, in various embodiments, the network 130 employs part of the Internet.

The client computer 120 ("client 120") is generally any type of computing device that can connect to network 130 and execute the image decoding techniques described herein. For example, in an embodiment, client 120 is a terminal such as a zero client, thin client, personal computer, a digital signage device or tablet device. Client 120 typically comprises one or more peripheral devices such as a mouse, keyboard and display 122 for presenting a remote Graphical User Interface (GUI).

In dual display or multi-display configurations not depicted in FIG. 1, each enumerated display device may be allocated a separate frame buffer. In such instances, the input image 160 may be partitioned into several logical frame buffers to support the underlying physical display topology.

In the embodiment of FIG. 1, client computer 120 comprises the decoder 124 (decoder 124') which includes image decoder services such as lossless decompression, lossless motion vector processing and image decoder functions paired to those of image encoder 148. In some embodiments, the decoder 124 is implemented, at least in part, as a set of machine executable instructions stored in memory and executed by the client computer 120. In other embodiments, the decoder 124 is implemented at least in part as a hardware accelerator function such as part of an application specific integrated circuit (ASIC) or field programmable gate array (FPGA) with memory and a display interface.

Figure 2:
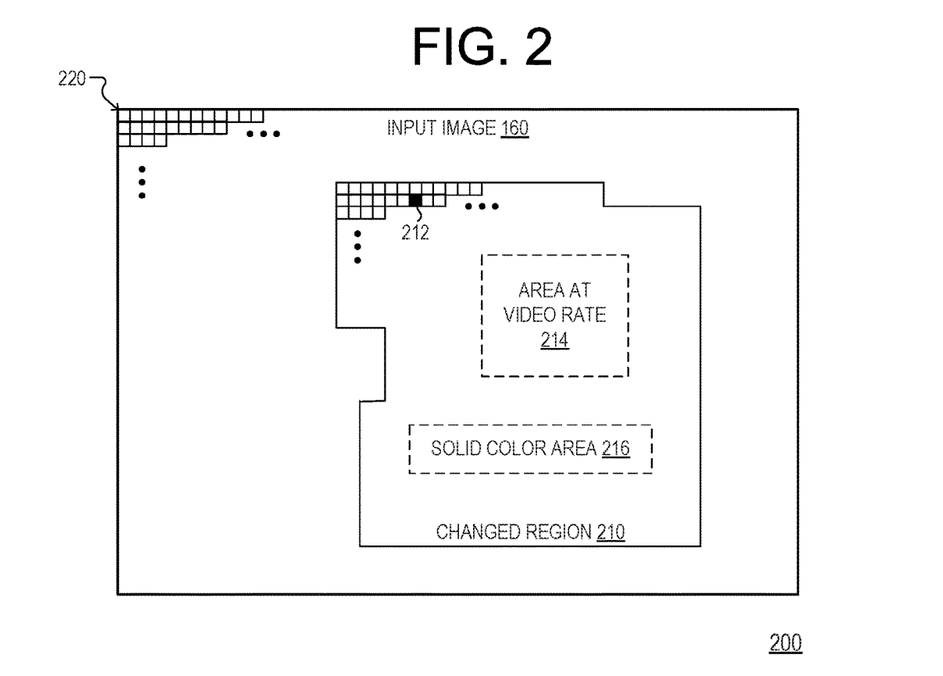
FIG. 2 illustrates an input image with a changed region and an area at a determined video rate in accordance with exemplary embodiments of the present invention.

FIG. 2 illustrates an embodiment 200 of the input image 160 with an (X,Y) origin 220. In an embodiment, the input image comprises a two dimensional array of raster-ordered pixel values e.g. 32-bit values comprising concatenated 8-bit Red, Green, Blue (R,G,B) and alpha channel values) of dimensions matched with the resolution of display 122 (e.g. 1920×1080 High Definition (HD) or 3840×2160 Ultra High Definition (UHD) etc.). The input image 160 comprises at least one changed region 210. The changed region 210 specifies pixel values determined to have changed subsequent to the most recent encoded image frame, as recorded for example by software or hardware in an image change mask. The changed region 210 may comprise a single region, multiple regions or individual pixels of input image 160, each region comprising the shape and size corresponding to a particular set of updated pixels.

In an embodiment, the changed region 210 encompasses the video area 214 which comprises video content. Video area 214 may be determined to contain video content, for example, by detecting a periodic pixel update rate (e.g. 5 frames per second for at least one second, 24 frames per second, or the like) in the source image or as determined by intercepting software instructions en route to video drivers. According to an embodiment, video areas are excluded from lossless motion processing due to the poor likelihood that any set of pixels might be exactly replicated at different positions in sequential video frames. By excluding video content, the number of pixels of changed region 210 designated for lossless motion processing is reduced and a corresponding improvement in host processing efficiency is attained. In other embodiments, no such video area 214 is present. In another embodiment suited to rolling hash implementations that yield high pixel coverage at the expense of relatively high processor and memory bandwidth utilization, the solid color area 216 is also excluded from lossless motion processing in order to limit the returned number of null motion vector candidates. Such solid color areas may be encoded using well-known techniques such as color cache coding which provides efficient low bandwidth coding for solid color regions.

The input image 160 is mapped to the unit matrix 162 which identifies 'target pixels' to be subjected to hash processing based on specified screen coordinates and image change status. In an embodiment that deploys hardware accelerated hash processing (e.g. AES-NI capabilities of hash engine 118) target pixels comprise the set of pixels which are i) identified by the unit matrix 162, ii) fall within the changed region 210, and iii) fall outside the video area 214. The pixel 212 is just one of a plurality of 'target pixels' identified in the changed region 210.

Figure 3:
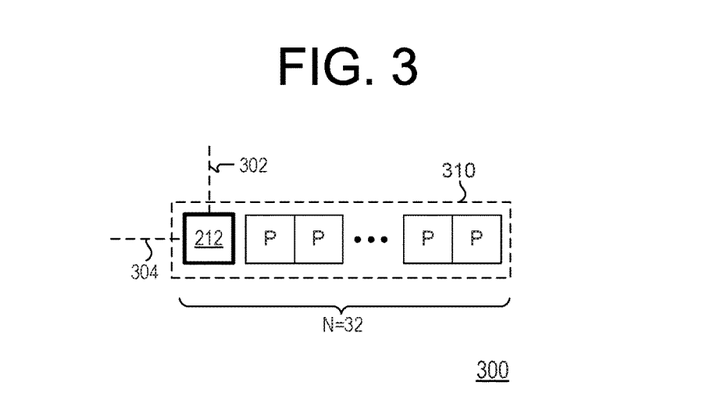
FIG. 3 illustrates a hash set comprising a target pixel and related set of spatially associated pixels in accordance with exemplary embodiments of the present invention.

FIG. 3 illustrates an embodiment 300 of the set of pixels 310 (alternatively referred to as hash set 310) comprising a set of spatially associated pixels, including the target pixel 212 located at row co-ordinate 302 (i.e. X co-ordinate 302) and column co-ordinate 304 (i.e. Y co-ordinate 304) relative to the origin 220 of input image 160. Hash set 310 which comprises target pixel 212 and thirty one consecutive adjacent following pixels is a data structure well matched and cache friendly with respect to the Intel AES-NI instruction set and related hash engine 118. However, such a data structure is shown without loss of generality. In different embodiments the hash set 310 may comprise either fewer or more pixels to suit an alternative hashing function. Furthermore, alternative spatial arrangements such as i) at least one pixel preceding target pixel 212 or ii) at least one pixel in a row above pixel 212 or iii) at least one pixel in a row below pixel 212 may be compatible with alternative memory access or hash processing arrangements. In an embodiment, the hash set 310 comprises a set of consecutive pixels.

Figure 4:
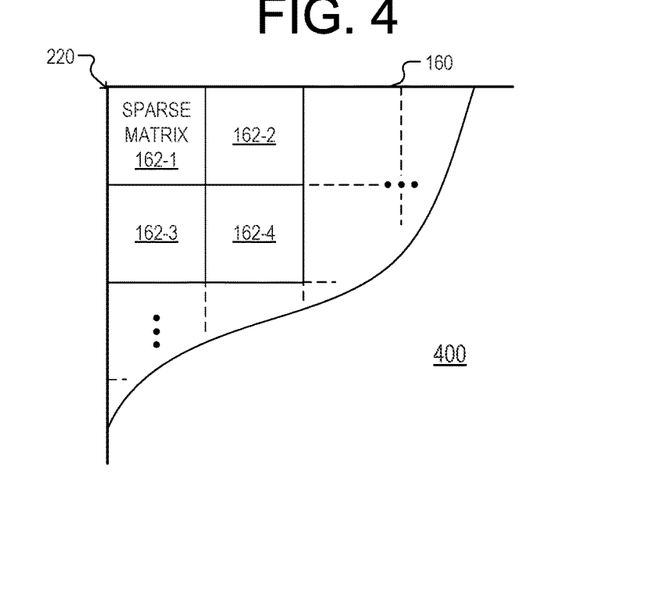
FIG. 4 illustrates a partial view of an input image covered by replicated sparse unit matrices in accordance with exemplary embodiments of the present invention.

FIG. 4 illustrates a partial view 400 of the input image 160 covered by a set of replicated unit matrices. The unit matrix 162 which specifies sparse fixed target pixel locations, or sparse display coordinates, of the underlying input image (i.e. target pixels specified by the unit matrix 600 described below) is mapped to the input image 160 as a sequence of tiles replicated in X and Y directions, an exemplary set depicted as tiles 162-1, 162-2, 162-3 and 162-4. It is noteworthy that the co-ordinates of target pixels specified by the replicated unit matrices are defined in relation to the origin 220 of the input image rather than specific attributes of the changed region 210. In instances where the X or Y dimensions of input image 160 are not precisely divisible by the corresponding X or Y dimensions of the unit matrix 162, remainder portions of input image 160 (i.e. untiled regions at the edges of the input image 160 not covered by a unit matrix) may remain uncovered because all regions that have changed (including regions at screen edges) are checked for motion against popular vectors regardless of representation in input image symbol table 164. Therefore motion vectors will be generated for all valid lossless motion including windows dragged partially off-screen or, in a multi-monitor display topology, content dragged from one display to another.

Figure 5:
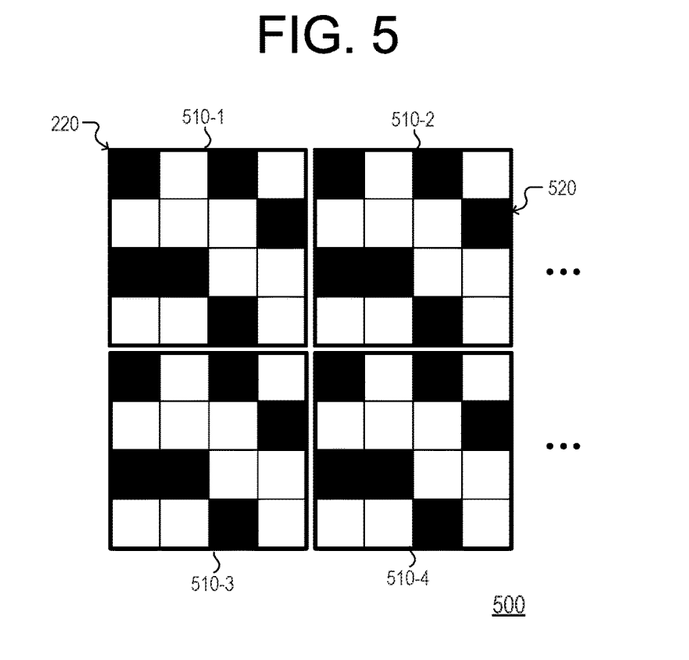
FIG. 5 illustrates an arrangement of replicated unit matrices in accordance with exemplary embodiments of the present invention.

FIG. 5 illustrates an exemplary arrangement of four replicated unit matrices. Each of the 4×4 unit matrices 510-1, 510-2, 510-3 and 510-4 comprises a 2D Golomb ruler. The arrangement is depicted to show the step-wise replication of a unit matrix and associated target pixels. It should be noted that the exemplary 4×4 unit matrix 510 is shown for convenience of description but generally too small for efficiency purposes. A larger matrix such as the 64×64 unit matrix 600 is well suited to practical embodiments. Target pixels of the input image 160 that correspond to marked pixels of arrangement 500 are hashed, each in conjunction with a particular hash set. Marked pixels, including exemplary marked pixel 520 are indicated in black while pixels skipped are indicated in white. Arrangement 500 is guaranteed to detect every possible displacement from (0,0) to (3,3), in addition to further displacements as unit matrix boundaries are spanned. The embodiment of FIG. 5 requires 6/16=37.5% of pixels to be processed. However, when a 2D Golomb ruler is used, an increased size of the unit matrix results in a corresponding decreased proportion of target pixels that require processing while continuing to ensure motion detection.

Figure 6:
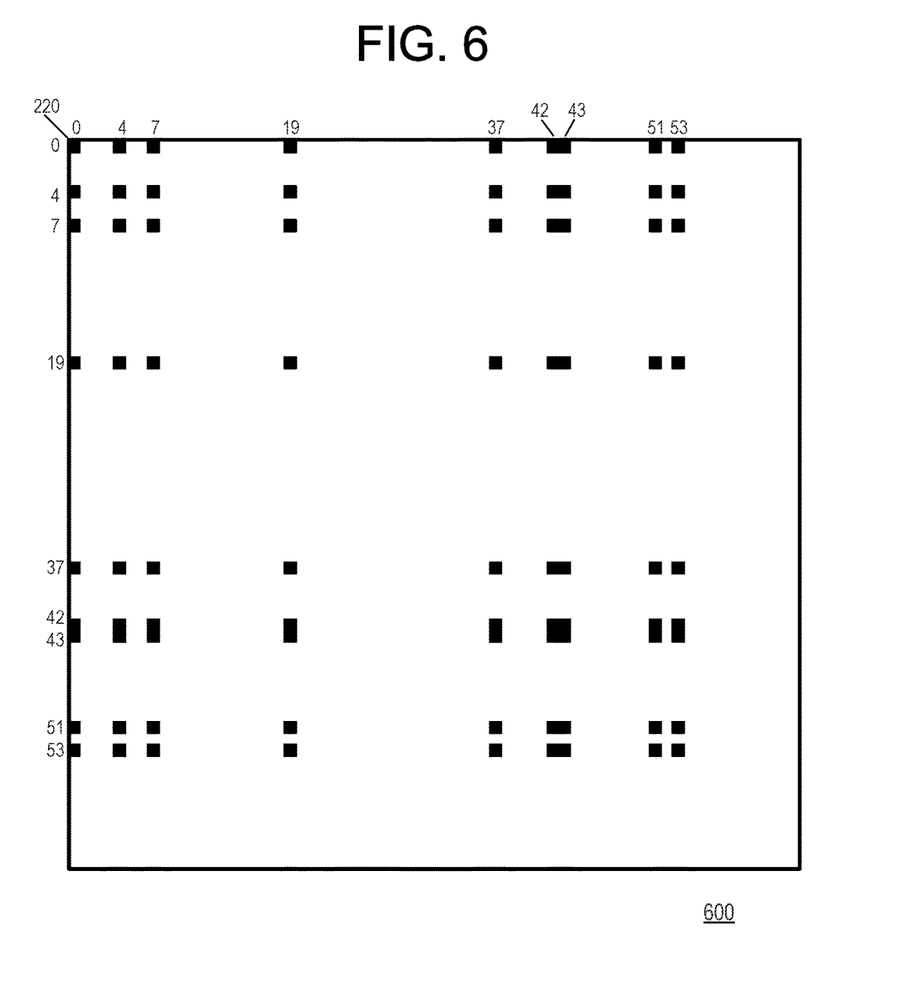
FIG. 6 illustrates a unit matrix comprising a 64×64 two dimensional Golomb ruler in accordance with exemplary embodiments of the present invention.

FIG. 6 illustrates a unit matrix 600 comprising a 64×64 2D Golomb ruler with cache friendly alignment of target pixels.

The unit matrix 600 is specifically designed for replication as a set of tiles covering an input image 160 such that the tiled arrangement is capable of detecting every possible displacement from (0,0) to (63,63), in addition to displacements that span tile boundaries. The unit matrix 600 is conveniently specified by an X dimension ruler of nine markings at locations (0, 4, 7, 19, 37, 42, 43, 51 and 53) spread over a total of sixty-four divisions. The X dimension ruler is replicated as nine rows (0, 4, 7, 19, 37, 42, 43, 51 and 53) at the same spread in the Y dimension. Consequently, of the 64 rows in the unit matrix 600, only nine rows have markings, and for those nine rows containing markings, there are only nine samples per row. Thus, of the 4096 total pixels in the 64×64 pixel grid, even though only 81 pixels are sampled (i.e. 2%), theoretically every motion vector can be determined. It is noteworthy that each time a row is void of target pixels (i.e. 55 rows of unit matrix 600), memory bandwidth is preserved when the row is skipped by hash function 142. In other embodiments comprising memory architectures suited to column-wise pixel access, the unit matrix 600 is optimized for column-wise access by reducing the number of columns comprising target pixels.

In other embodiments, different sparse matrix arrangements are contemplated using mathematical structures known to the art such as Costas Arrays, Welch Costas arrays, Lempel-Golomb arrays or arrays defined by a random number generator that ensures that all locations in a minimally sized sample area have similar probability of detection (such as 128×128 pixel area covering a typical small desktop image feature) i.e. hashed pixel sets are distributed evenly over the minimally sized sample area. In an embodiment, a unit matrix is derived from a Costas array by eliminating all target pixels in select rows to improve cache efficiency. In another embodiment, the unit matrix 162 is scaled to match the processing capabilities of host processor 116, for example enabling small areas to be processed quickly by utilizing Single Instruction Multiple Data (SIMD) coding features of the host processor 116. In another embodiment, the unit matrix 162 is scaled and/or offset to align with the cache arrangement or cache line size of memory 112.

Figure 7:
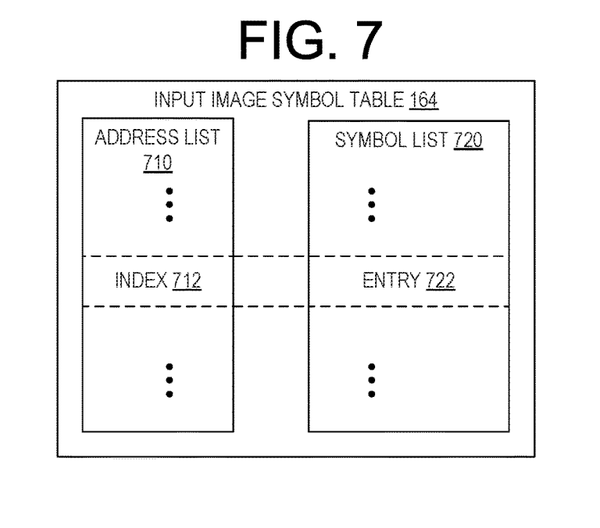
FIG. 7 illustrates an embodiment of an input image symbol table in accordance with exemplary embodiments of the present invention.

FIG. 7 illustrates an embodiment of the input image symbol table 164 which stores coordinates of target pixels (as identified by the replicated unit matrices) at table locations, each indexed by a partial hash value derived from the RGB values of a target pixel and associated hash set. The symbol table 164 comprises an address list 710 (i.e. memory addresses) each address providing an index to an entry in the symbol list 720; for example index 172 is mapped to entry 722. The number of indices in symbol table 164 may be scaled according to the number of target pixels. In an exemplary embodiment utilizing the unit matrix 600, a symbol table is sized at 128,000 entries to support 38,880 target pixels of a 1920×1080 format display. (A 1920×1080 display comprises 480 complete tiles of 64×64 dimension and each tile has 81 target pixels).

Unlike conventional hash tables that store multiple entries against each index, symbol table 164 stores a unique entry against each index which enables direct computation of the difference map 168 using a series of simple subtractions (i.e. subtract each coordinate entry in symbol list 720 from the corresponding entry in the reference image symbol table 166. Conventional hash tables are characterized by comparatively high memory bandwidth utilization and unpredictable data access latencies.

Figure 8:
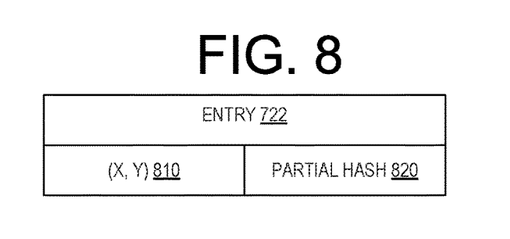
FIG. 8 illustrates a symbol table entry in accordance with exemplary embodiments of the present invention.

FIG. 8 illustrates an embodiment of the entry 722 comprising at least (X,Y) coordinates 810 which identify X and Y coordinates for the target pixel associated with the index 712. In some such embodiments, the entropy of table 164 is increased by adding partial hash 830 to entry 722, comprising an upper bit portion of the hash value used to index the table 164. In an exemplary embodiment, the 17 most significant bits of a 32 bit hash value may be stored as partial hash 830.

Figure 9:
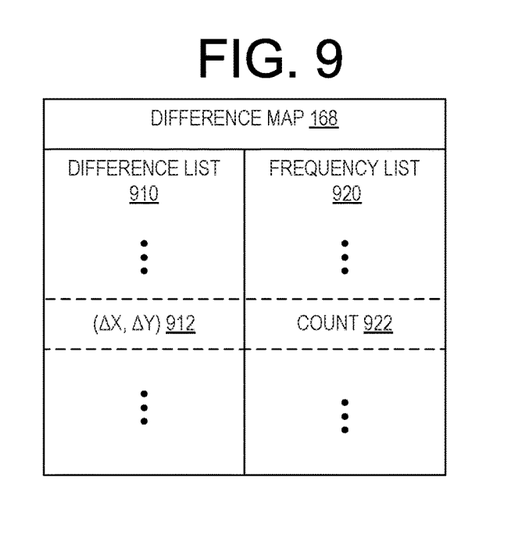
FIG. 9 illustrates a difference map comprising a difference list and corresponding frequency list in accordance with exemplary embodiments of the present invention.

FIG. 9 illustrates an embodiment of the difference map 168 comprising the difference list 910 with differential (i.e. delta) coordinate pair 912 (alternatively termed 'candidate motion vector' 912) and corresponding frequency list 920 with exemplary count 922. Each candidate motion vector 912 in difference list 910 comprises a (ΔX, ΔY) pair of differential coordinate values computed by subtracting each set of (X,Y) coordinates 810 in symbol list 720 from the corresponding set of (X,Y) coordinates at the same index in the reference image symbol table 166. The count 922 maintains a record of the number of times (i.e. popularity) that each identified (ΔX, ΔY) pair in the current input frame is encountered.

Figure 10:
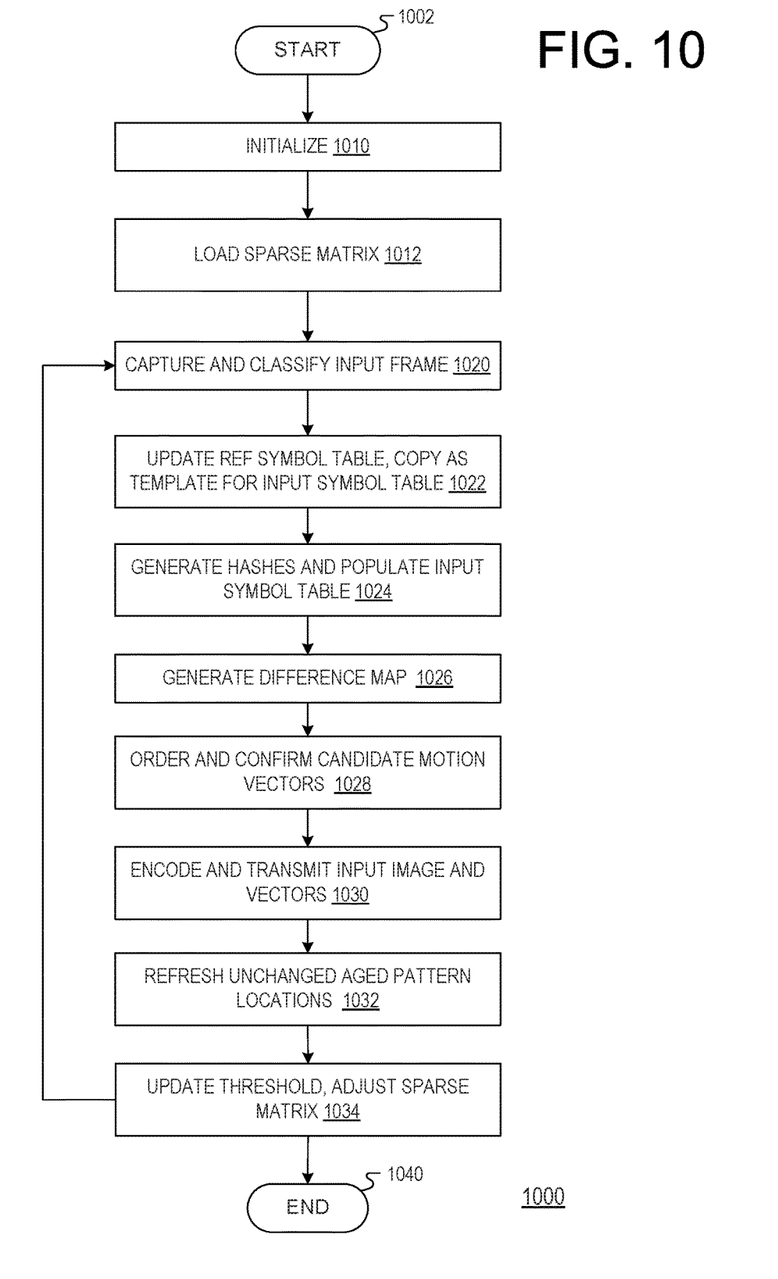
FIG. 10 illustrates a method for transmitting a compressed display sequence using a sparse unit matrix in accordance with exemplary embodiments of the present invention.

FIG. 10 illustrates a method 1000 executed by a central processing unit and hash engine of host processor 116 for transmitting a compressed display sequence using a sparse unit matrix to determine and process lossless motion vectors.

Method 1000 starts at step 1002 ("Start") and proceeds to step 1010 ("Initialize"). Data structures including symbol tables 164 and 166, and difference map 168 are initialized. In an embodiment, specifications for the width and height of input image 160 are used to determine a suitable power-of-two length value used to initialize the symbol tables 164 and 166. In an embodiment, the length value itself is a variable tuning parameter. Firstly a maximum table length is calculated. As an example, a display of 1920×1080 resolution comprising 2,073,600 values establishes a baseline length value of 2,097,192 according to the nearest power of 2 requirements (i.e. 2^21). The length value is tuned (e.g. 2^20, 2^19, etc.) in the interests of limiting memory utilization and memory bandwidth associated with table copy functions at the expense of motion detection accuracy. A hash function 142 is selected and initialized by determining the availability or absence of optimized hashing primitives provided for host processor 116 and hash engine 118 (e.g. INTEL SSE2, SSE3, SSE4 and AES-NI instructions).

In an embodiment, the input image 160 is partitioned into a grid (e.g. 8×8 or 16×16 pixel blocks) and metadata for each block initialized at step 1010. Such metadata may comprise block change status that specifies if a block is 'changed' or 'unchanged' since prior processing and block age information comprising an age counter indicating the number of entries applied to the input image symbol table 164 since the block last changed.

Method 1000 proceeds to step 1012 ("Load Sparse Matrix") in which a sparse matrix is loaded into memory 112, generally prior to image capture. In one embodiment, a unit matrix 600 is loaded. In another embodiment, the unit matrix 162 comprises a two dimensional sparse array using a target pixel distribution density (i.e. spacing) and/or target pixel pattern optimized to achieve a specified probability of confirmed motion vectors with the least processing utilization of host processor 116. E.g. the maximum target pixel spacing is determined according to a confidence guarantee such as 95% confidence that the smallest supported block size (e.g. 100×100 pixels) will be detected when subjected to any motion. Such an optimized target pixel distribution may be determined by simulating representative screen content and identifying the knee-point in a curve that maps CPU utilization to network bandwidth consumption for different target pixel distribution densities or different target pixel patterns. When unit sparse matrices are tiled out over large areas of input image 160, validation of optimum target pixel spacing includes validation that the confidence guarantee is maintained when the smallest supported block crosses tile boundaries.

Method 1000 proceeds to step 1020 ("Capture and Classify Input Frame") in which input image 160 is retrieved from the graphics sub-system or via the display interface of host computer 110 and processed by classifier 140. In some embodiments, the changed region 210 is determined from a change map provided by the graphics sub-system. In other embodiments, the changed region is determined by comparing the input image 160 to a previously captured frame stored in memory 112. In some embodiments, the classifier 140 may determine the video area 214 and/or the solid color area 216 which are masked out to avoid further motion processing.

Method 1000 proceeds to step 1022 ("Update Reference Symbol Table and Copy as Template for Input Symbol Table") in which the previously used input image symbol table 164 is re-designated as the reference image symbol table 166. This symbol table is also copied as a template for the new input image symbol table 164 to be repopulated.

Method 1000 proceeds to step 1024 ("Generate Hashes and Populate Input Symbol Table") in which for each target pixel in changed region 210 (and associated hash set 310) as identified by the unit matrix 162 (ref. exemplary target pixel 212), hash function 142 generates a hash code. In an embodiment, the hash code is generated by the hash engine 118 under direction of software executed by the host processor 116. For each hash code, an index 712 into the input image symbol table 164 is computed by masking the upper bits of the hash code. The existing entry 722 referenced by the computed index is overwritten with the (X,Y) coordinates 302 and 304 of the target pixel. In an embodiment, the updated entry 722 further comprises partial hash 820 derived from the pre-masked hash code. In another embodiment, step 1024 is aborted prior to execution of the hashing function if the entire hash set associated with the target pixel falls within a solid color area (ref. area 216). In such an embodiment, the color check is executed in conditional phases for CPU efficiency purposes. In a first phase, step 1024 is flagged to continue if a quick comparison reveals the first and last pixels in the hash set to be of different values. In a second conditional phase, other pixels in the hash set are checked until at least one color difference is identified (and step 1024 continues) or step 1024 is aborted if all colors in the hash set are identical. Once all target pixels have been hashed, the input image symbol table 164 is primed for comparison against the reference image symbol table 166. In an embodiment, metadata information of unchanged image blocks is updated at step 1024 by incrementing an age counter for each unchanged block every time a symbol entry is made into the symbol table 164. Further details related to refreshing of aged blocks in the symbol table 164 are described in method 1100. If, at step 1024 an insignificant number of hashes are generated (e.g. symbol representation of less than 5% of the display surface), motion search may be aborted by bypassing steps 1026 and 1028.

Method 1000 proceeds to step 1026 ("Generate Difference Map") in which the difference processor 144 reinitializes any previous difference map (e.g., difference map 168). Each entry in the symbol list 720 is then compared against the corresponding entry in the reference image symbol table 166. If the partial hash 820 matches the corresponding partial hash in reference image symbol table 166 and the coordinate entry 810 is different, it is statistically likely that the hash set 310 has relocated to a new location. In an embodiment, statistical confidence is assured by conducting a direct pixel value comparison between at least one of the individual pixels in hash set 310 and the corresponding individual pixel at the different location in the reference image 180. If the hash set match is confirmed, the differential coordinate pair 912 is computed and stored in difference list 910. If an identical differential coordinate pair already exists in difference list 910, the corresponding count 922 in frequency list 920 associated with the (X, Y) delta is incremented.

Once all candidate motion vectors have been computed, method 1000 proceeds to step 1028 ("Order and Confirm Candidate Motion Vectors") in which motion vector processor 146 reorders the difference list 910 and ranks the frequency of counts according to popularity for each candidate motion vector. In other words, according to an embodiment, the candidate motion vector with the highest count in frequency list 920 is ordered first with less popular candidate motion vectors ordered by decreasing popularity thereafter. Then, starting with the most popular motion vector, changed pixel blocks in the input image 160 (as determined by a change map for example) that exactly match corresponding pixels blocks in the reference image 180 after the candidate motion vector is applied are marked as confirmed motion blocks. In an embodiment, confirmed blocks matched to a single motion offset are eliminated from further comparisons in the interests of processing efficiency. In another embodiment, block comparison processing is terminated once the popularity drops below a specified popularity threshold number of counts. In yet another embodiment, all levels of popularity are examined. If no candidate motion vectors achieve a popularity threshold, new entries to symbol table 164 are nevertheless preserved to be re-evaluated as motion vector candidates in the following iterative loop of method 1000.

Method 1000 proceeds to step 1030 ("Encode and Transmit Input Image and Vectors") in which the image encoder 148 optionally applies arithmetic encoding to the confirmed motion vectors and processes other changed regions in the input image not covered by motion vectors using well known frequency domain or spatial image encoding techniques. The compressed image is packetized (e.g. UDP/IP datagrams or TCP/IP segments) and transmitted to the client computer 120. The decoder 124 decodes the received encoded motion vectors and constructs the forthcoming image frame in the display sequence by applying the decoded motion vectors to the existing output image frame on display 122.

Figure 11:
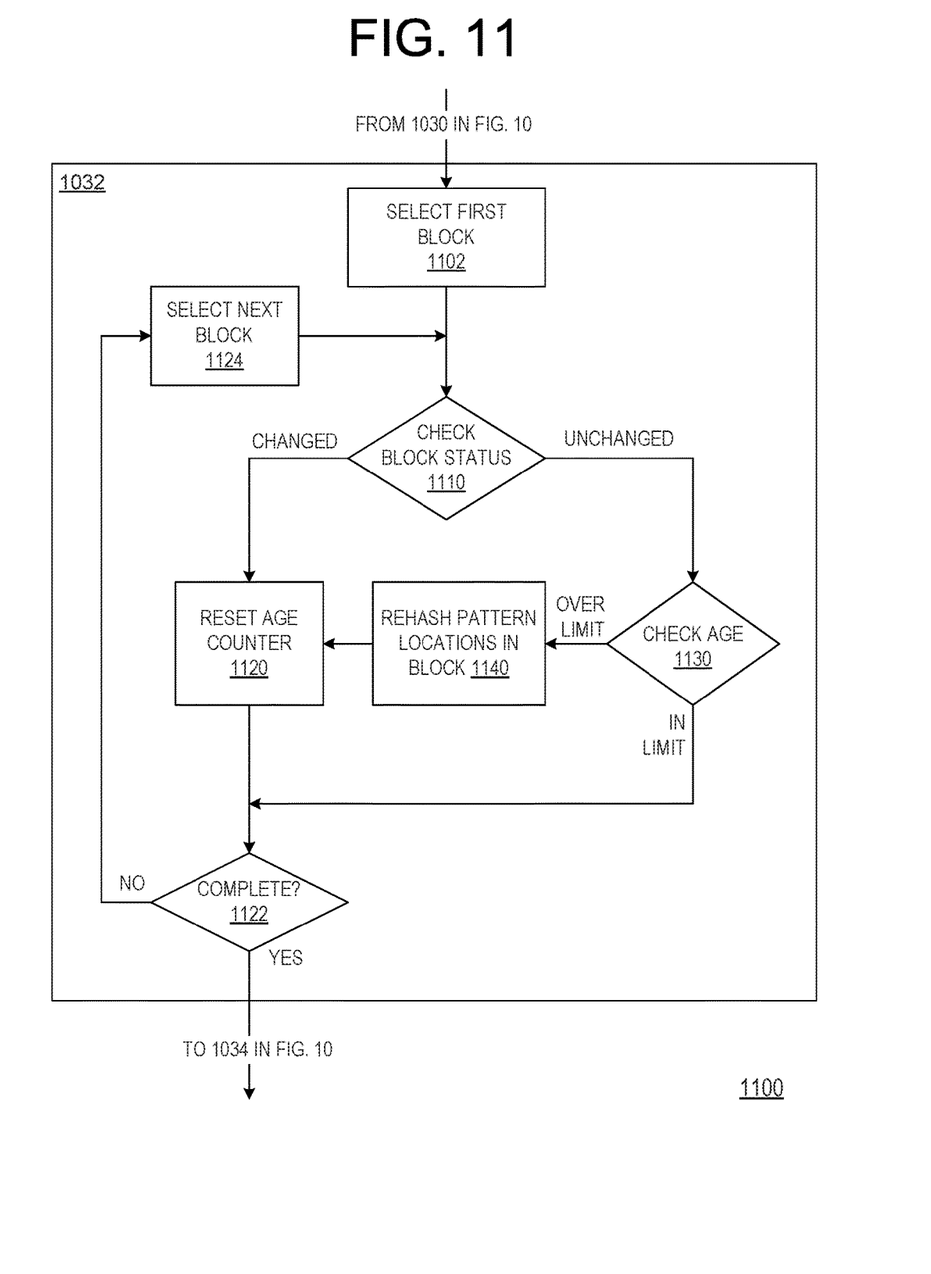
FIG. 11 illustrates a method used to refresh entries in a symbol table corresponding to unchanged pixels in an input image in accordance with exemplary embodiments of the present invention.

Method 1000 proceeds to step 1032 ("Refresh Unchanged Aged Pattern Locations") which ensures that unchanged on-screen content remains synchronized with the input image symbol table 164. An embodiment of step 1032 is depicted as method 1100.

Method 1000 proceeds to step 1034 ("Update Threshold"). In an embodiment, the popularity threshold is increased or decreased based on resource demands such as CPU availability, memory bandwidth utilization or network availability. In another embodiment, properties of the unit matrix 162 are adjusted to increase or decrease the number of motion vectors. As an example, in the event of increased CPU availability on a constrained network 130, the target pixel density of unit matrix 162 is increased to increase the confidence guarantee for small regions under motion. As another example, in the event of decreased CPU availability on a relatively unconstrained network, the target pixel density of unit matrix 162 is decreased. This lowers the confidence guarantee for small regions under motion but frees up the host processor 116.

If following step 1034, an additional input image frame is available for processing, the current input image frame (e.g., input image 160) is recast as the reference image 180 and the method 1100 returns to step 1020. If following step 1034, it is determined that method 1000 should terminate, such as after a remote session disconnection event, method 1000 proceeds to step 1040 ("End").

FIG. 11 illustrates method 1100 comprising select details of the step 1032 used to refresh entries in symbol list 720 corresponding to unchanged pixels located in input image 160. Because the symbol list 720 may be of constrained length, any changed pixel in input image 160 that corresponds with a target pixel generates a new symbol that overwrites an old symbol previously written in symbol table 164. Such an old symbol corresponds with an earlier changed pixel related to content that may yet be subjected to motion. To prevent a majority or all such previously written symbols from being completely overwritten over time (sometimes by superfluous pixel updates such as pop-up notifications, the desktop clock and the like with little or no likelihood of motion), symbols related to aging content are periodically refreshed by evaluating the change status and age of all blocks related to the input image 160. At step 1102 ("Select First Block"), the change status of the first block of input image 160 (as determined by raster order for example) is evaluated.

If at check 1110 ("Check Block Status") the selected block is determined to have changed, method 1100 proceeds to step 1120 ("Reset Age Counter") in which the age counter is reset and method 1100 proceed to check 1122 ("Complete"). At check 1122, the completion status of method 1100 is evaluated. If all blocks are processed, the method 1100 exits to step 1034. If further blocks require age state evaluation, method 1100 returns to step 1124 ("Select Next Block") in which the next block in input image 160 is selected for evaluation and the method 1100 repeats check 1110 with the next block.

If at check 1110, the selected block is determined to have not changed, method 1100 proceeds to check 1130 ("Check Age"). If at check 1130, the age of the selected block is within a predetermined age limit, the method 1100 exits to step 1034. In an embodiment, the predetermined age limit is set equivalent to the length of the symbol list 720. If at check 1130, the age is evaluated to have hit the predetermined age limit, the method 1100 proceeds to step 1140 ("Rehash Pattern Locations in Block") in which all locations in the selected block that are indicated as target pixel locations are rehashed and associated (X,Y) information is entered in the input image symbol table 164. Method 1100 proceeds to step 1120 in which the age counter of the selected block is reset and the method 1100 proceeds to completion check 1122.

In an embodiment, the method 1100 is executed after the input image symbol table 164 is updated at step 1024 for all changed pixels. In another embodiment, the age check 1130 on unchanged blocks is performed concurrently with symbol table updates applied at step 1024 such that updates related to refreshed symbols are interleaved with updates related to changed pixels.

Figure 12:
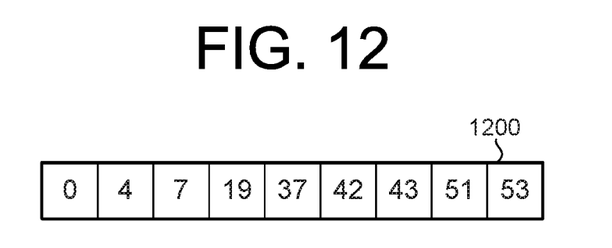
FIG. 12 illustrates a compact representation of a unit 2D Golomb ruler which is replicated over a frame, in accordance with exemplary embodiments of the present invention.

FIG. 12 illustrates a compact representation of a unit 2D Golomb ruler 1200 which is replicated over a frame. Golomb ruler 1200 is an embodiment of the unit matrix 600 represented as a single dimension array, each of the entries in the ruler 1200 representing a mark in both X and Y dimensions of the 64×64 unit matrix 600.

Figure 13:
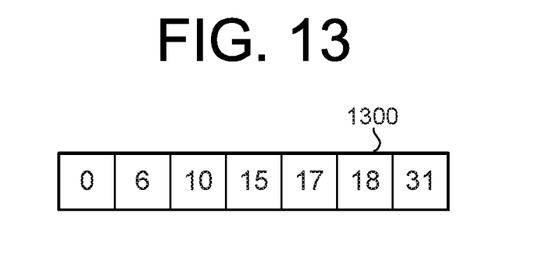
FIG. 13 illustrates a compact representation of a unit 2D Golomb ruler which is replicated over a frame in accordance with exemplary embodiments of the present invention.

FIG. 13 illustrates a compact representation of a unit 2D Golomb ruler 1300 which is replicated over a frame. Ruler 1300 is an embodiment of a 32×32 unit matrix 162 represented as a single dimension array with each of the entries in the ruler 1300 representing a mark in both X and Y dimensions of the 32×32 unit matrix.

While the foregoing is directed to embodiments of the present invention, other and further embodiments of the invention may be devised without departing from the basic scope thereof, and the scope thereof is determined by the claims that follow.

The invention claimed is:

1. A method for motion determination in an image display sequence comprising:
generating, at a host computer, a hash value for each changed pixel of changed pixels in a frame of the image display sequence, the changed pixels indicated in a set of sparse display coordinates;
for each changed pixel, overwriting (X, Y) information at a position in a symbol table indexed by the hash value, the (X, Y) information comprising one display coordinate pair in the set of sparse display coordinates associated with the each changed pixel;
generating motion vectors for a frame in the image display sequence, each motion vector specifying a pixel area determined from at least one (X, Y) delta in the (X, Y) information between one of the changed pixels represented in the symbol table and a previously changed pixel represented at the position in a previous frame symbol table, the previous frame symbol table for a previous frame in the image display sequence; and
transmitting the motion vectors from the host computer over a network to a client computer.

2. The method of claim 1 further comprising:
generating, at the host computer, additional hashes for unchanged pixels correspondingly indicated in the set of sparse display coordinates, wherein each of the additional hashes is generated following an age of a corresponding pixel in the unchanged pixels.

3. The method of claim 2 wherein the age is determined from a count of the overwritten (X, Y) information following a change in the corresponding pixel in the unchanged pixels.

4. The method of claim 1 wherein the set of sparse display coordinates is defined by a unit 2D Golomb ruler replicated over the frame.

5. The method of claim 1 wherein pixel density within the set of sparse display coordinates is adjusted based on at least one of CPU availability of the host computer and bandwidth availability of the network.

6. The method of claim 1 wherein the hash value is generated by hardware encryption circuitry of the host computer.

7. The method of claim 1 wherein the (X, Y) information includes select significant bits of the hash value.

8. The method of claim 1 wherein each of the motion vectors is selected based on a ranking of counts associated with the at least one (X, Y) delta.

9. The method of claim 1 wherein each of the motion vectors is selected based on a threshold number of counts associated with the at least one (X, Y) delta.

10. The method of claim 1 wherein each of the motion vectors is validated by confirming that the pixel area in the frame matches a second pixel area at the at least one (X, Y) delta in the previous frame.

11. The method of claim 1, further comprising:
recasting the symbol table as the previous frame symbol table following the generation of the motion vectors.

12. The method of claim 1 wherein the changed pixels comprise at least one portion of the frame, exclusive of video pixels, the video pixels identified as continuously changing at a rate of at least five frames per second for a period of at least 1 second.

13. The method of claim 1 wherein the set of sparse display coordinates is partitioned across a plurality of frame buffers associated with the frame.

14. The method of claim 1 wherein the set of sparse display coordinates is determined prior to acquiring an image comprising the changed pixels.

15. The method of claim 1 wherein the hash value for each of the changed pixels is generated from a hash set associated with one pixel in the changed pixels and wherein the hash set comprises a common spatial arrangement.

16. The method of claim 1, wherein the set of sparse display coordinates is arranged in X and Y dimensions according to a ruler of nine markings spread over a total of sixty-four divisions.

17. The method of claim 16 wherein the nine markings are located at positions 0, 4, 7, 19, 37, 42, 43, 51 and 53 on the ruler.

18. An apparatus for motion determination in an image display sequence comprising:
a host processor of a host computer comprising:
a hash engine that:
generates a hash value for each changed pixel of changed pixels in a frame of the image display sequence, the changed pixels indicated in a set of sparse display coordinates; and
a central processing unit that:
for each changed pixel, overwrites (X, Y) information at a position in a symbol table indexed by the hash value, the (X, Y) information comprising one display coordinate in the set of sparse display coordinates associated with each changed pixel; and
generates motion vectors for a frame in the image display sequence, each motion vector specifying a pixel area determined from at least one (X, Y) delta in the (X, Y) information between one of the changed pixels represented in the symbol table and a previously changed pixel represented at the position in a previous frame symbol table, the previous frame symbol table for a previous frame in the image display sequence,
wherein the host processor transmits the motion vectors from the host computer over a network to a client computer.

19. The apparatus of claim 18, wherein the set of sparse display coordinates are defined by a unit 2D Golomb ruler replicated over the frame.

20. The apparatus of claim 19, wherein pixel density within the set of sparse display coordinates is adjusted based on at least one of CPU availability of the host computer and bandwidth availability of the network.

* * * * *